United States Patent [19]

Brouwer

[11] Patent Number: 4,486,654
[45] Date of Patent: Dec. 4, 1984

[54] OPTICAL PATTERN TRACING SYSTEM WITH IMPROVED MANUAL CONTROL

[75] Inventor: Frans Brouwer, Glencoe, Ill.
[73] Assignee: ESAB, North America, Inc., Fort Collins, Colo.
[21] Appl. No.: 302,653
[22] Filed: Sep. 15, 1981
[51] Int. Cl.³ .................. G05B 1/00; H01G 5/06
[52] U.S. Cl. .................. 250/202; 361/292; 361/298
[58] Field of Search .............. 250/202; 318/577; 361/292, 298, 299

[56] References Cited

U.S. PATENT DOCUMENTS

| | | | |
|---|---|---|---|
| 3,306,104 | 2/1967 | Corcoran | 361/292 |
| 3,337,789 | 8/1967 | Ono et al. | 361/292 |
| 3,704,372 | 11/1972 | Parker et al. | 250/202 |
| 4,371,782 | 2/1983 | Brouwer | 250/202 |

*Primary Examiner*—David C. Nelms
*Assistant Examiner*—J. Brophy

[57] ABSTRACT

An optical pattern tracing system of the type having a tracing head with a scanner that projects a photocell onto a pattern-line with an improved manual resolver for providing control signals to drive the tracing head in an approach direction toward the pattern-line. The manual resolver is a capacitive resolver constructed of foil elements and an angularly adjustable coupling disc mounted directly on a printed circuit board that also carries much of the other control circuitry for the tracing system.

11 Claims, 9 Drawing Figures

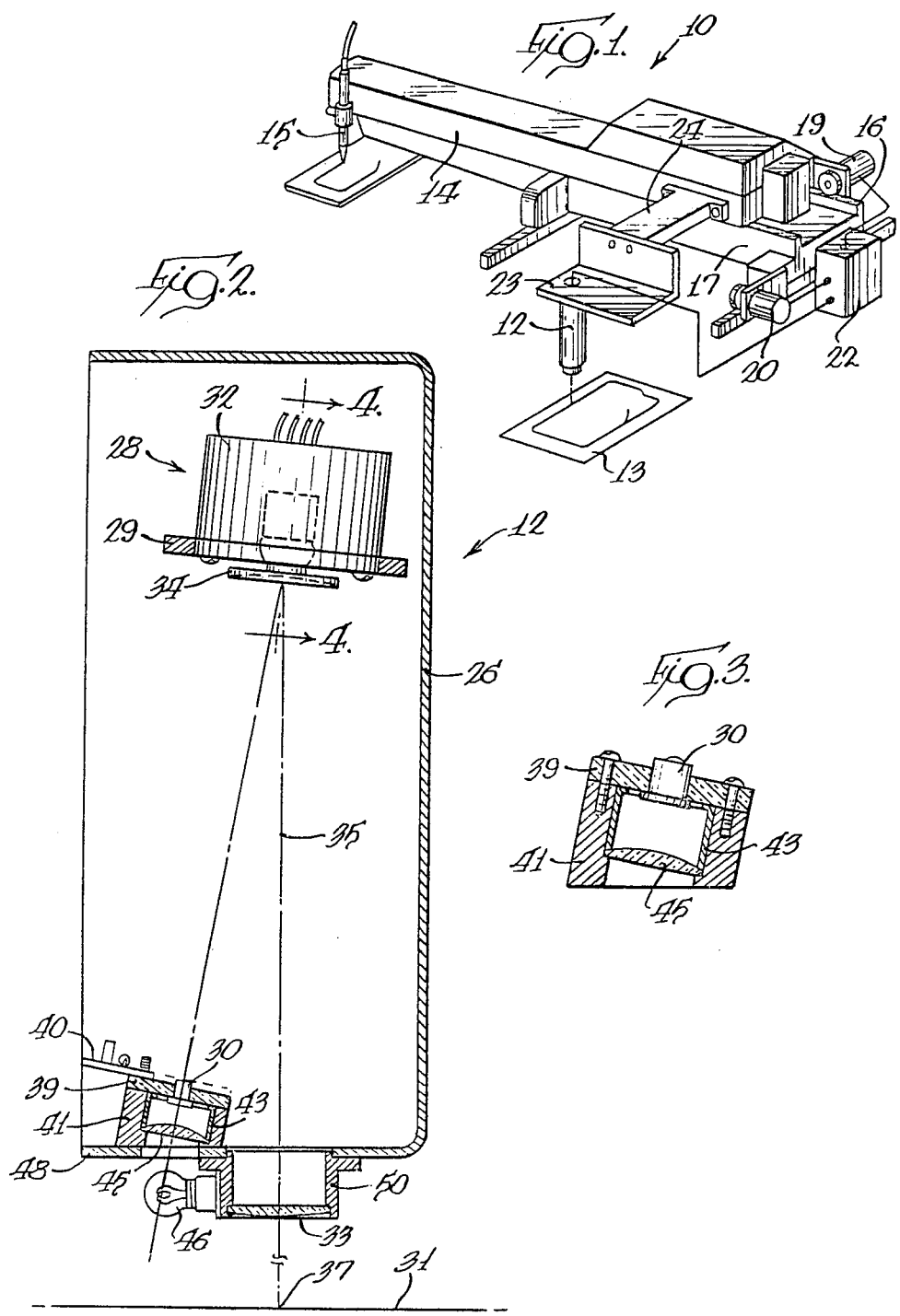

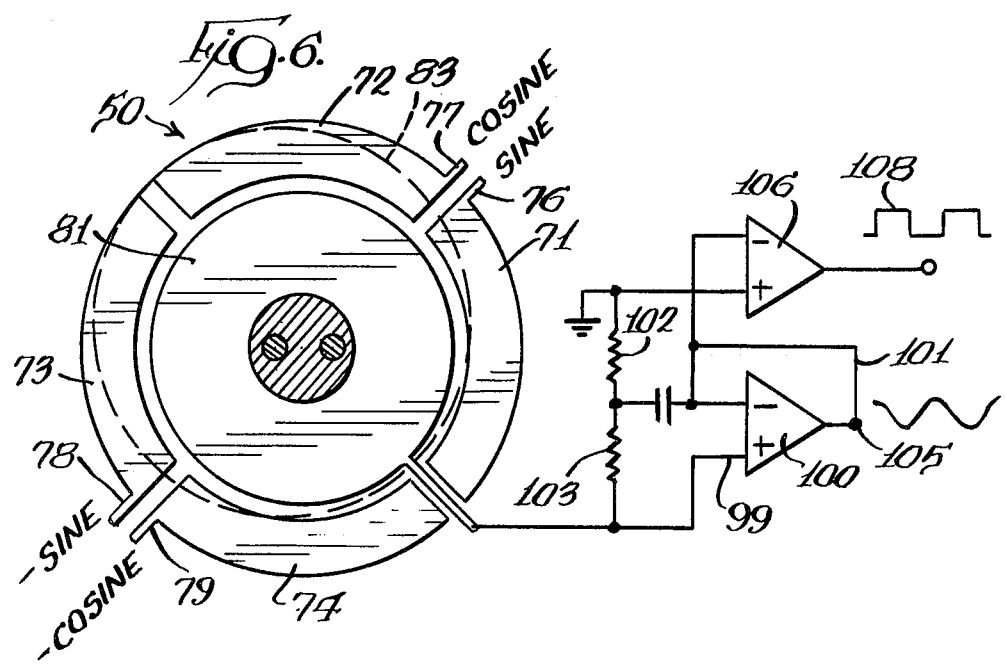
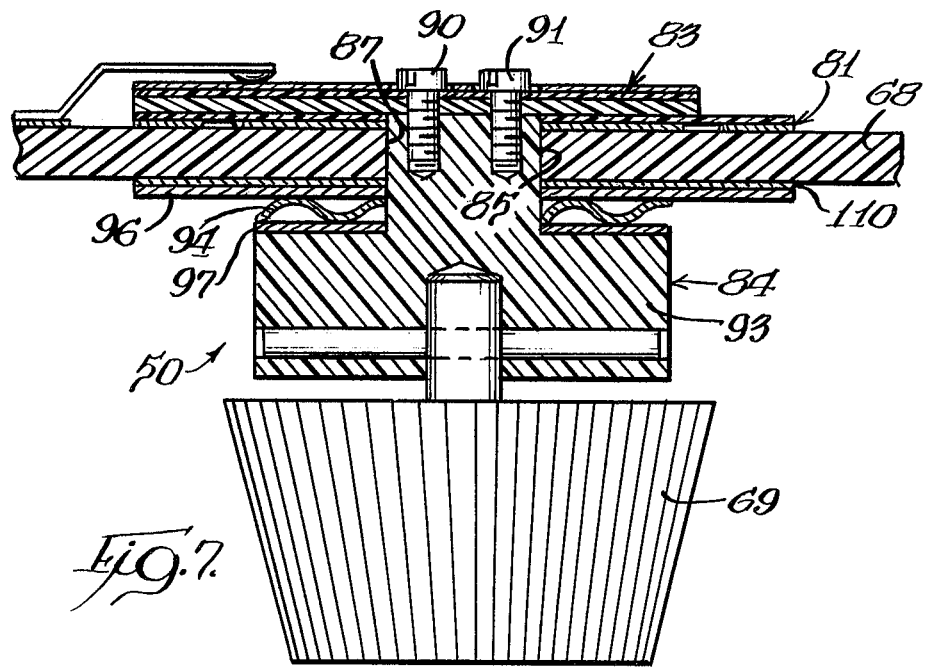

OPTICAL PATTERN TRACING SYSTEM WITH IMPROVED MANUAL CONTROL

BACKGROUND OF THE PRESENT INVENTION

In conventional pattern tracing systems of the optical type, a scanner mirror forms part of an optical system which normally projects a photocell onto a line or edge which is part of the pattern to be traced. When the photocell traverses the pattern, signals are obtained from the photocell which are used to derive directional and displacement signals which in turn are used to derive signals for X and Y coordinates servo-systems that maintain the optical scanning system positioned properly above the pattern while driving it along the pattern at a preselected speed.

The speed signals for the tracing head are generally set to a predetermined value on a control panel, which value when multiplied by the sine and cosine of the angle that the pattern makes with a reference direction form individual coordinate speed signals which are usually directly added to the servo-input signals. Sine and cosine signals are derived from the optical scanning information, either with electromechanical synchro-resolvers in the tracing head or with electronic sine/cosine resolving circuits, and these signals are fed to the respective servo-motors to control servo-motor speed along each coordinate so that the tracing head follows the pattern to be traced.

Optical pattern tracers of this type are widely used in the industry to guide machine tools such as flame cutting machines or milling machines along a path identical to that on a flat or two-dimensional pattern. Examples of these systems are illustrated in the Barry et al. U.S. Pat. No. 2,499,178, the Brouwer U.S. Pat. No. 3,017,552, and the Jewel U.S. Pat. No. 3,322,952.

In these optical tracing systems, pattern-line catching has always been a difficult problem and in fact many commercially available tracers have totally unreliable pattern-line catching systems. Still other pattern catching systems known in the prior art are capable of achieving adequate pattern catching only when the pattern is approached at a shallow angle by the tracing head. Frequently the pattern catching systems in known optical pattern tracers either fail to catch the line at all or are uncertain as to the direction of travel following catching. Most pattern catching systems presently known are incapable of distinguishing direction once the scanner is locked onto a line.

The present invention relates particularly to optical scanners that project a photocell in a circular or eliptical scan path on the pattern-line. They usually include an electronic resolver that consists of a sine/cosine generator for producing four sine waves mutually shifted in phase by 90 degrees. These sine and cosine waves are each fed to a sample and hold circuit, and a pulse train derived from signals from the photocells momentarily opens the sample and hold circuits at a given phase angle and causes capacitors in the sample and hold circuits to be charged at DC values corresponding to the instantaneous values at the phase angle of the cosine and sine waves from the generator. These DC voltages are fed to X and Y servo-amplifiers on a machine frame for the tracer to drive a compound slide in a direction corresponding to the phase of photocell signals.

In automatic steering systems the phase of the pulses from the photocell controls the opening of the sampling and hold circuits and such a photocell processing system is illustrated in my co-pending U.S. patent application Ser. No. 108,549 filed Dec. 31, 1979 now U.S. Pat. No. 4,371,782, entitled An Optical Pattern Tracing System and corresponding International application No. PCT/U.S. 80/01717, filed Dec. 23, 1980, and reference should be made thereto for a complete description of the scanner mechanism and the manner of processing the photocell signals for this purpose.

Some of these prior optical pattern tracing systems include a pattern approach and catching sub-system that enables an operator to select a manual steering direction for approaching the pattern to be followed. One such sub-apparatus includes a mechanical sine/cosine potentiometer that is connected to receive the sine waves produced by the electronic generator. The potentiometer includes a rotatably mounted slider that engages four equally spaced arcuate resistors which are arranged to produce a sine wave in the slider having a phase proportional to the angle of the slider on the potentiometer. The slider sine wave is fed through a high gain amplifier that produces a square wave pulse train that is used as the directional pulse train for the purpose of manual steering. The operator thus selects the appropriate approach direction by setting the angle on the potentiometer slider. These resistive type manual resolvers are very expensive and add significantly to the cost of the overall tracing system. Moreover, the metal-to-metal contact in these potentiometers creates wear which, after a relatively short time, requires replacement of the entire potentiometer.

SUMMARY OF THE PRESENT INVENTION

In accordance with the present invention an optical pattern tracing system is provided of the type having a tracing head with a scanner that projects a photocell in a path across a pattern-line or edge to be traced and a control circuit that responds to signals from the photocell to steer the tracing head along the pattern-line including an improved manual resolver that enables the operator to drive the tracing head towards the line in an approach direction and that is a capacitive resolver constructed of foil elements and a coupler directly mounted on a printed circuit board that provide a variable phase sine wave that is developed into a phase controlled pulse train for steering the tracing head in the direction selected by the operator.

Toward this end an electronic resolver is provided that includes a sine/cosine generator for producing four sine waves mutually shifted in phase by 90 degrees. These sine and cosine waves are each fed to a sample and hold circuit and a pulse train derived either from signals from the photocell or from signals from the manual resolver momentarily opens the sample and hold circuits at a given phase angle and cause capacitors in the sample and hold circuits to be charged to DC values corresponding to the instantaneous values of the angle of the cosine and sine waves from the generator. These DC voltages are fed to X and Y servoamplifiers on the machine frame for the tracer to drive a compound slide in a direction corresponding to the phase of the pulse trains.

The present capacitive resolver includes four input segments each connected to one of the output sine waves from the sine wave generator. These input segments are thin arcuate pieces of conductive copper foil forming part of the surface of a printed circuit board upon which most or all of the remaining control circuitry for the tracer is mounted, although more than one circuit board may be provided in the tracing system. These arcuate input segments or foil electrodes are annularly arrayed in spaced fashion around a central annular copper foil output electrode also part of the surface of the circuit board coplanar with the input foil segments. An insulator covers both the input foils and the output foil segment, and an electrical conducting metal coupling disc is mounted on top of the insulator on a central shaft extending through the output annular foil segment. This disc is circular in configuration and is eccentrically mounted on the central shaft so that it covers the annular output segment regardless of its angular position, and coVers selected ones of the input electrodes depending upon its angular position.

The disc is angularly positioned by a knob on the front of the control panel provided for the tracer and it enables the operator to easily select the approach direction of the tracing head toward the line. The coupling disc is capacitively coupled to each of the input segments depending upon its angular position causing a sinusoidal signal to appear on the disc the phase of which corresponds to the angular position of the shaft upon which the disc is mounted. The disc is also capacitively coupled to the output foil segment and the resulting sinusoidal signal in the central output foil is fed to an operational amplifier having a unity gain that recreates the signal at the output electrode at a low impedence.

The output foil itself has a very high impedance that is shielded by placing a ground foil on the printed circuit board opposite the resolver electrodes and a grounded metal plate above the coupling disc.

This resolver completely replaces prior potentiometers at a very small fraction of their cost without any significant degradation in linearity performance. The input and output electrodes are foil elements that are printed on the board as part of the circuit without any additional cost so that only the mechanical disc and its associated shaft parts require separate manufacture. This resolver results in a cost reduction of as much as 90 percent over known potentiometer resolvers.

BRIEF DESCRIPTION OF THE DRAWINGS

FIG. 1 is a perspective view of an optical pattern tracing system according to the present invention positioning flame cutting tools;

FIG. 2 is an enlarged view, partly in section, showing the tracing head subassembly illustrated in FIG. 1;

FIG. 3 is an enlarged fragmentary view of a photocell assembly illustrated in FIG. 2;

FIG. 6 is an enlarged plan view of the manual resolver according to the present invention including a square wave producing output circiut;

FIG. 7 is a cross-section of the manual resolver illustrated in FIG. 6;

DETAILED DESCRIPTION OF THE PREFERRED EMBODIMENT

Figure 4:
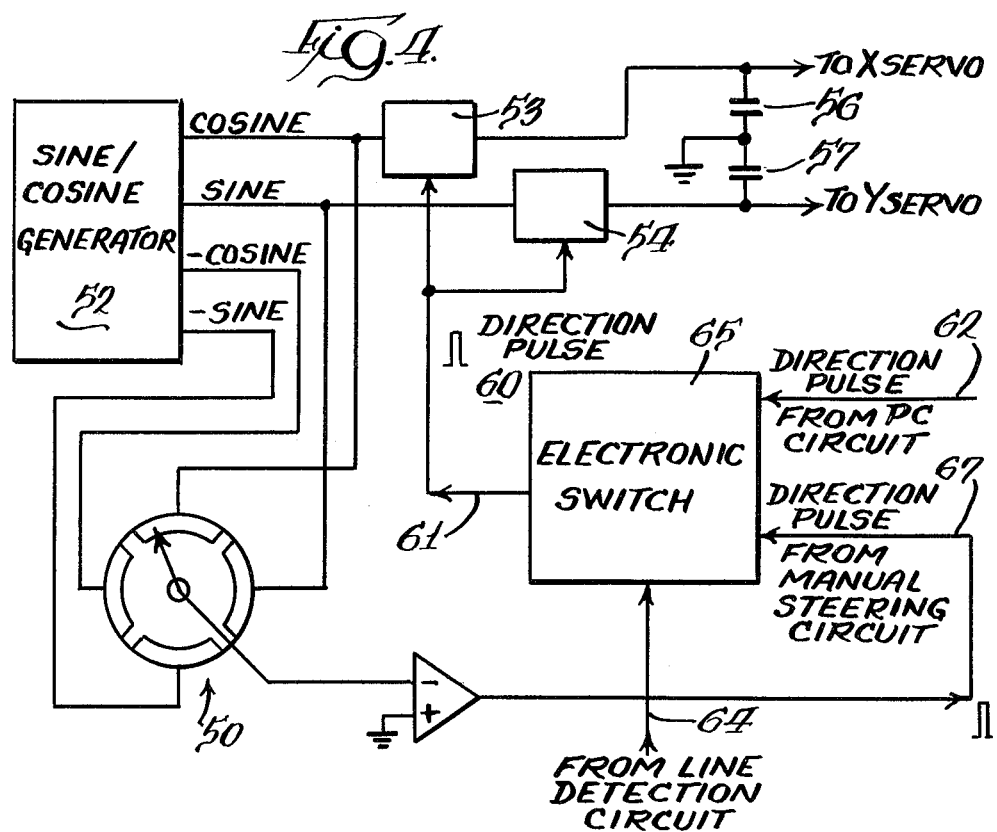
FIG. 4 is a block diagram of a control circuit for the present tracing system including a manual resolver according to the present invention.

Referring to the drawings, and particularly to FIG. 1, a flame cutting machine 10 is illustrated having a tracing head 12 that follows a pattern 13 and provides control signals for shifting a machine slide 14 about two axes controlling the position of a flame cutting tool 15. The slide 14 is reciprocably mounted on way 16 carried by a transversely reciprocable slide 17, to provide two axes motion for the tracing head 12 and the flame cutting tool 15. Slide 14 is driven by servomotor 19 and slide 17 is driven by servomotor 20 from a control console 22 provided with control signals by the tracing head 12.

With the exception of the tracing head 12, the general description of the flame cutting machine 10 above is conventional, although it should be understood that the present tracing system can be used to control the movement of other tools besides flame cutting tools.

The tracing head 12 is non-rotatably mounted on a bracket 23 above pattern 13 that is carried by slide 14 from an arm 24 fixed to the slide 14.

As seen in FIG. 2, the tracing head 12 includes a generally rectangular housing 26 that is non-rotatably fixed to frame 23. An optical scanner 28 is mounted in housing 26 on an angularly positioned support frame 29 and serves to direct the image of a photocell 30 onto a pattern 31 through a lens 33. The scanner 28 includes an annular housing 32 carried by frame 29 and a mirror 34 mounted for pivotal movement about two orthogonal axes. The mirror 34 is concave, although it may be desirable under certain conditions for it to have a flat rather than a concave reflecting surface. The mirror 34 is angularly positioned along with frame 29 such that when at rest, it projects photocell 30 on an axis coincident with a reference 35 that is the geometric axis of lens 33 onto a reference point 37 on the pattern.

A spot finder is provided to assist the operator in easily locating the area on the pattern being scanned. Toward this end, the photocell 30 is supported in a clear plastic plexiglass holder 39 angularly supported in housing 26 by an annular frusto-cylinder 41. A printed circuit board 40 is mounted on holder 39 and for processing control signals from photocell 30. The annular support 41 has a cylindrical diaphragm 43 and a condenser lens 45 mounted therein that projects light from a flood lamp 46 to the mirror 34 around the photocell 30. To obtain maximum light intensity, the lens 45 is a condenser lens that focuses the filament of lamp 46 on mirror 34. The diaphragm 43 with the photocell 30 outline and define a ring of light which is projected by mirror 34 around the axis of the mirror 34 regardless of its position and therefore, it is always concentric with the scan spot. Flood lamp 46 is fixed to the housing 26 and is positioned below lower portion 48 of the housing so that it illuminates the pattern 31. The intensity of the ring of light reflected from the flood lamp 46 by the mirror 34 onto the pattern is quite a bit higher than the light that reaches the pattern 31 directly from flood lamp 70 so that it is very clearly visible to the operator.

The geometric or optical axis of the mirror 34 nutates about an axis during scanning and when it does so the ring of light projected from the flood lamp 46 by the mirror 34 onto the pattern scribes an annular or circular high intensity light area that enables the operator to locate the scanned area regardless of the offset nutational axis of the mirror 34 with respect to the fixed reference axis 35.

The lens 33 is mounted in a lens holder 49 fixed to the lower housing 48 of the tracing head and it has a long focal length that does not significantly contribute to the focusing of the optical system.

The scanner 28 includes two perpendicularly related electromagnetic stationary coils that deflect mirror 34 which is supported in the scanner by a transverse diaphragm that carries a permanent magnet shown in dotted lines in FIG. 2. Out of phase alternating signals in each of these coils causes pure nutational motion of mirror 34 around the static axis of the mirror. By applying equal amplitude alternating signals of 90 degrees phase difference to these coils, the mirror axis scribes a cone of which the top is approximately coincident with the center of the mirror and the resulting scan path of the optical system on the pattern 31 is annular in shape. By providing unequal amplitude signals to these coils, or signals less than 90 degree phase shift, the mirror 34 scribes a cone projecting an eliptical scan path on pattern 31.

Figure 5:
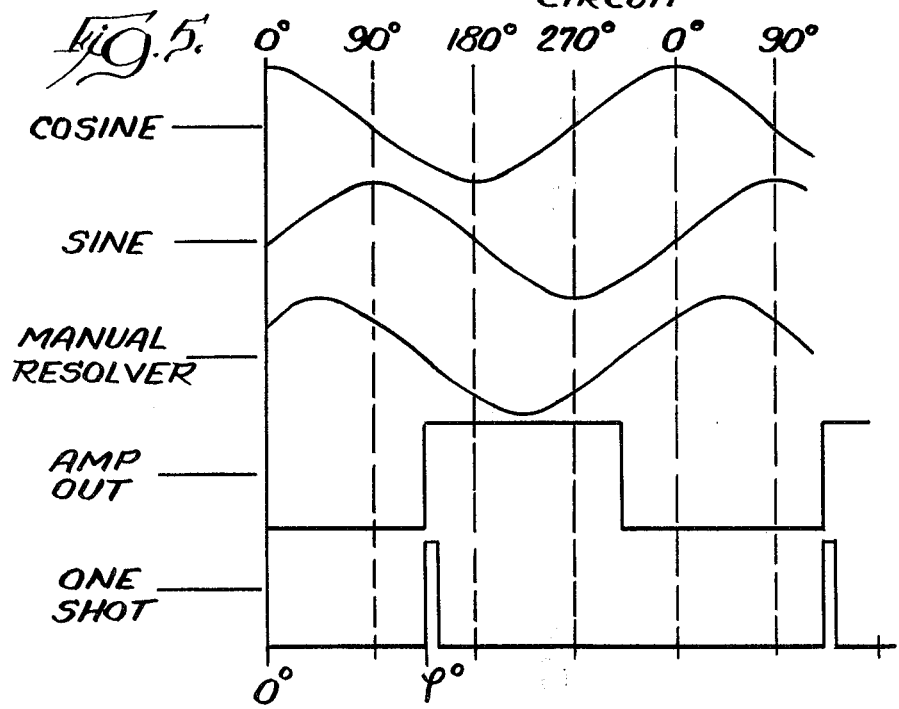
FIG. 5 is a diagram of the input and output waveforms from the manual resolver according to the present invention.

FIG. 4 illustrates in block diagram form a tracer control circuit including a manual capacitive resolver 50 according to the present invention. An electronic resolver is illustrated including sine/cosine generator 52, gates 53 and 54, and sampling capacitors 56 and 57. The generator 52 produces four sine waves mutually shifted in phase by 90 degrees and labeled cosine, sine, −cosine, and −sine. In FIG. 5, the cosine and sine waves are illustrated at a and b as a function of phase. The cosine and sine waves are each fed to a sample and hold circuit that includes gate 53 and capacitor 56 for cosine and gate 54 and capacitor 57 for sine. A train of phase modulated control pulses 60 in line 61 that are synchronous with the sine waves are used for opening gates 6 and 8 momentarily at a given phase angle $\phi$ and they cause capacitors 56 and 57 to be charged to DC values corresponding to the instantaneous values at angle $\phi$ of the cosine and sine waves respectively. When the DC voltages in capacitors 56 and 57 are proportionally fed to X and Y servo-amplifiers of an X-Y machine frame, more particularly amplifiers associated with servomotors 19 and 20 in FIG. 1, the compound frame 14, 17, will move in a direction $\phi$ with reference to the positive X-axis. These pulses are illustrated in line e of FIG. 5. Thus, the phase of the pulses in line 61 corresponds to the steering direction.

For automatic steering of the tracing head when the line or edge is caught by the tracer, directional or steering pulses are received from the scanning photocell (not shown) in line 62 which, after passing through suitable processing circuitry which is conventional, provide signals of continuously varying phase angle $\phi$ (FIG. 5) corresponding to directional changes in a pattern contour. These steering pulses are applied to the sampling gates 53 and 54 to drive the tracing head in that direction to properly follow the pattern being traced. Reference should be made to my copending U.S. patent application Ser. No. 108,549 filed Dec. 31, 1979, and entitled An Optical Pattern Tracing System and corresponding International application No. PCT/U.S. 80/01717, filed Dec. 23, 1980 for a complete description of a scanning mechanism and apparatus for producing proper steering signals for this purpose.

The manual resolver 50 according to the present invention provides steering pulses to the sampling gates 53 and 54 prior to the time that the tracer arrives at the pattern edge or line. After the photocell intersects the line during approach a signal is provided in line 64 from a line detection logic circuit that switches electronic switch 65 to switch output line 61 from manual signal line 67 to automatic signal line 62 from the photocell.

Figure 8:
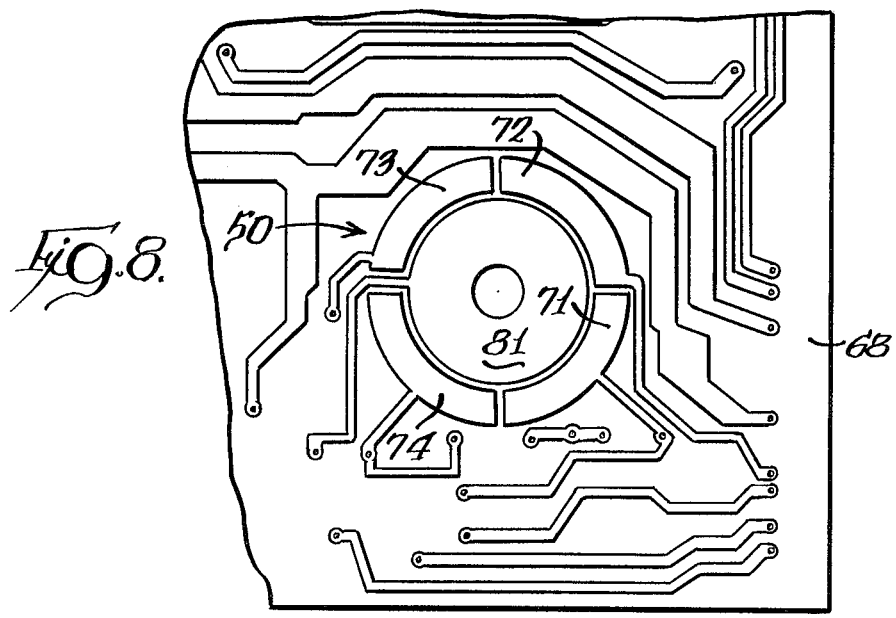
FIG. 8 is a fragmentary section of a printed circuit board illustrating the input and output foil electrodes on the board.
Figure 9:
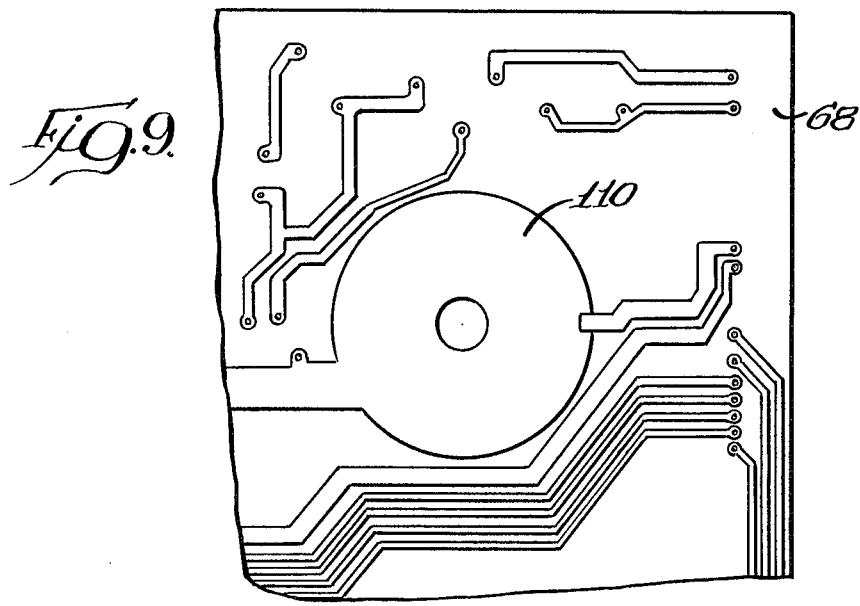
FIG. 9 is a fragmentary section of the opposite side of the printed circuit illustrated in FIG. 8.

As seen more clearly by the enlarged views of FIG. 6 and 7, and particularly in FIG. 7, the present manual resolver is mounted directly on a printed circuit board 68 that is shown in greater detail in FIGS. 8 and 9. The resolver is controlled from the front of a control console, such as control console 22 illustrated in FIG. 1, by a manual control knob 69. The resolver 50 includes four arcuate copper foil segments 71, 72, 73, and 74 printed on board 68 in an annular array each connected to receive one of the sine, cosine, −sine, and −cosine signals from generator 52 through lines 76, 77, 78, and 79 respectively. The foil segments 71 to 74 form the input electrodes for the resolver 50.

A central annular copper foil segment 81 is mounted within and spaced from the annular array of input segments 71, 72, 73, and 74 and defines the output electrode for the resolver. These input and output electrodes are very simply printed on the board with the remaining circuitry for the tracer and require no special parts or fabrication.

As seen more clearly in FIG. 7, a thin, circular disc of plastic film such as teflon is positioned over and engages the surfaces of the input and output electrodes and defines an insulator between the input and output electrodes and a circular coupling disc 83 angularly positioned by the manual control knob 69.

The coupling disc 83 is a metal electrically conductive circular disc and is rotatably supported on the insulator 82 by a stepped bushing 84. Bushing 84 has a circular reduced portion 85 that is rotatably mounted in an aperture 87 in the circuit board 68 and fixed to the disc 83 by spaced insulated fasteners 90 and 91. The bushing 84 has an enlarged circular portion 93 on the opposite side of the circuit board 68 from the disc 83 that provides a reaction shoulder against which a wave washer spring 94 reacts through washers 96 and 97 engaging the circuit board 68 and the enlarged portion 93 respectively. Spring washer 94 serves to continuously urge the disc 83 into engagement with the insulator 82 while at the same time permits free rotational sliding movement of the disc.

As seen more clearly in FIG. 6, the disc 83 is eccentrically mounted on bushing-reduced portion 85 so that its outer perimeter selectively covers the input foil segments 71, 72, 73, and 74 depending upon the angular position of the bushing 84 and disc 83. The disc 83 has a sufficient radius however so that it covers the output foil segment 81 regardless of its angular position.

The portion of disc 83 that partly covers the input foil segments 71, 72, 73, and 74 has a capacitive coupling to these segments causing a sinusoidal signal to appear on disc 83, the phase of which corresponds to the angular position of the bushing 84 and manual control knob 69. The sine wave on disc 83, through its capacitive coupling with output foil segment 81, is reproduced at input 99 of a field effect transistor-input operational amplifier 100. Amplifier 100 has a bootstrap feedback 101 to input resistors 102 and 103 effectively removing any resistive loading on the output foil electrode 81. Amplifier 100 has a unity gain and recreates the signal on output electrode 81 at a low impedance on terminal 105. A high gain amplifier 106 through its inherent limiting action translates the signal at 105 into a square wave output indicated at 108.

The angular position of disc 83 as preset by the knob 69 provides an output signal 108 illustrated in FIG. 3 that after processing provides steering control signals as represented by waveform e of FIG. 5 to the sample and hold circuitry of the resolver illustrated in FIG. 4 to steer the tracing head. Suitable calibration is provided on the control console so that the operator may select the desired approach angle.

The circular configuration of coupling disc 83 provides adequate linearity for most tracing applications. The linearity of the resolver 50 is defined as the relationship between the electrical phase angle of the signals 108 from amplifier 106 and the angular position of the control knob 69 and disc 83. The disc 83 may alternatively be somewhat pear-shaped or heart-shaped in configuration to provide somewhat better linearity.

The resolver 50, and particularly its very high output impedance, is shielded by a ground foil on the board 68 on the opposite side of the electrodes as well as a metal plate mounted above disc 83 that is grounded. The ground foil on the opposite side of the board is illustrated at 110 in FIG. 9 showing the rear side of the printed circuit board.

FIGS. 8 and 9 above show a fragmentary portion of the circuit board for the control circuit of FIG. 4 including the input and output electrodes 71, 72, 73, 74, and 81 as foil elements or segments directly on board 68. Coupler disc 83 is not shown in FIG. 8.

I claim:

1. An optical pattern tracing system of the type having a tracing head with a scanner that projects a photocell on the pattern and provides signals to a control circuit that in response thereto derives control signals for coordinate servo-mechanisms that position the tracing head over the pattern, including means for generating manual control signals for the control circuiut to drive the tracing head in approach toward the pattern, characterized by a printed circuit board carrying at least a part of the control circuit and the means for generating manual control signals, means for generating out of phase reference signals for the control circuit, said means for generating manual control signals including a variable capacitor having a plurality of coplanar input conductive metal foil electrodes on the printed circuit board each connected to receive one of the signals from the means for generating reference signals, a conductive metal foil output electrode on the printed circuit board coplanar with the input foil electrodes, and an adjustable conductive metal coupler disc mounted adjacent and over the input and output foil electrodes electrically coupled to the output electrode and capacitively coupled to the input electrodes to develop a continuously varying signal in the output electrode having a phase corresponding to the adjusted position of the coupler disc.

2. An optical pattern tracing system as defined in claim 1, characterized by the input electrodes being arcuate in configuration and surrounding the output foil electrode, and an insulating film between the input and output electrodes and the conductive metal coupler disc so that it is capacitively coupled to both the input electrodes and the output electrode, eliminating the need for any direct sliding contact.

3. An optical pattern tracing system as defined in claim 1, characterized by a rotatable shaft mounted on the circuit board centrally of the output foil electrode, said metal coupler being a disc eccentrically mounted on the shaft so that it may be rotated over the desired input electrode, or portion thereof to achieve infinitely variable phase control for the continuously varying signal developed in the output electrode proportional to the angular position of the coupler.

4. An optical pattern tracing system as defined in claim 1, characterized by an operational amplifier connected to receive the signal from the output electrode, said operational amplifier having a bootstrap feedback to remove any resistive loading on the output electrode.

5. An optical pattern tracing system as defined in claim 4, characterized by the operational amplifier having a unity gain.

6. An optical pattern tracing system of the type having a tracing head with a scanner that projects a photocell on the pattern-line and provides signals to a control circuit that in response thereto derives control signals for coordinate servo-mechanisms that position the tracing head over the pattern, including means for generating manual control signals for the control circuit to drive the tracing head in approach toward the pattern, characterized by a printed circuit board carrying at least a part of the control circuit and the means for generating out of phase reference signals for the control circuit, said means for generating manual control signals including a variable capacitor having a plurality of input conductive metal foil electrodes on the printed circuit board each connected to receive one of the signals from the means for generating reference signals, said input electrodes including a plurality of arcuate planar foil segments arranged on a circle, an annular planar foil output electrode mounted on the printed circuit board within and spaced from the arcuate input electrodes, said input foil electrodes and said output foil electrode being coplanar, an insulation member engaging the input electrodes and the output electrode, and a conductive metal coupler disc rotatably mounted on the circuit board eccentrically positioned over the input electrodes and the output electrode in sliding engagement with the insulating member, said coupler disc being capacitively coupled to the output electrode and selectively to the input electrodes so that by angularly positioning the coupler disc a signal will be developed in the coupler disc and the output electrode having a phase proportional to the angular position of the coupler disc.

7. An optical pattern tracing system as defined in claim 6, characterized by an operational amplifier connected to receive the signal from the output electrode, said operational amplifier having a bootstrap feedback to remove any resistive loading on the output electrode, and the operational amplifier having a unity gain.

8. An optical pattern tracing system of the type having a tracing head with a scanner that projects a photocell on the pattern and provides signals for the control circuit to drive the tracing head in approach toward the pattern, characterized by a printed circuit board carrying a least a part of the control circuit and the means for generating manual control signals. means for generating out of phase reference signals for the control circuit, said means for generating manual control signals including a variable capacitor having a plurality of input conductive metal foil electrodes on the printed circuit board each connected to receive one of the signals from the means for generating reference signals, said input electrodes including four arcuate planar foil segments arranged on a circle, an annular planar foil output electrode mounted on the printed circuit board within and spaced from the arcuate input electrodes, said input foil electrodes and said output foil electrode being coplanar, an insulation member engaging the input electrodes and the output electrode, a conductive metal coupler disc rotatably mounted on the circuit board eccentrically positioned over the input electrodes and the output electrode in sliding engagement with the insulating member, said coupler disc being capacitively coupled to the output electrode and capacitively coupled selectively to the four input electrodes so that by angularly positioning the coupler disc a signal will be developed in the coupler disc and the output electrode having a phase proportional to the angular position of the coupler disc, and an operational amplifier connected to receive the signal from the output electrode, said operational amplifier having a bootstrap feedback to remove any resistive loading on the output electrode, the operational amplifier having a unity gain.

9. An optical pattern tracing system of the type having a tracing head with a scanner that projects a photocell on the pattern and provides signals to a control circuit that in response thereto derives control signals for coordinate servo-mechanisms that position the tracing head over the pattern, including means for generating manual control signals for the control circuit to drive the tracing head in approach toward the pattern, characterized by means for generating a plurality of out of phase reference signals for the control circuit, said means for generating manual control signals for the control circuit including a plurality of input foil segments, each of the input foil segments being connected to receive one of the reference signals, an output foil segment mounted adjacent and coplanar with and spaced from the input foil segments, an insulator engaging the input and output foil segments, and a conductive coupler plate engaging the insulator and adjustably positionable over the input and output segments to be capacitively coupled therewith to develop phase controlled signals in the output segment.

10. An optical pattern tracing system of the type having a tracing head with a scanner that projects a photocell on the pattern and provides signals to a control circuit that in response thereto derives control signals for coordinate servo-mechanisms that position the tracing head over the pattern, including means for generating manual control signals for the control circuit to drive the tracing head in approach toward the pattern, characterized by a printed circuit board carrying at least a part of the control circuit and the means for generating manual control signals, said means for generating manual control signals including a variable capacitor having a plurality of spaced input conductive metal foil electrodes on the printed circuit board.

11. An optical pattern tracing system of the type having a tracing head with a scanner that projects a photocell on the pattern and provides signals to a control circuit that in response thereto derives control signals for coordinate servo-mechanisms that position the tracing head over the pattern, including means for generating manual control signals for the control circuit to drive the tracing head in approach toward the pattern, characterized by a printed circuit board carrying at least a part of the control circuit and the means for generating manual control signals, said means for generating manual control signals including a variable capacitor having coplanar and spaced foil input and output electrodes on the printed circuit board.

* * * * *